United States Patent
Seo et al.

(10) Patent No.: US 9,652,162 B2
(45) Date of Patent: May 16, 2017

(54) ALL-IN-ONE DATA STORAGE DEVICE INCLUDING INTERNATIONL HARDWARE FILTER, METHOD OF OPERATING THE SAME, AND SYSTEM INCLUDING THE SAME

(71) Applicant: SAMSUNG ELECTRONICS CO., LTD., Suwon-si, Gyeonggi-Do (KR)

(72) Inventors: Man Keun Seo, Hwaseong-si (KR); Kwang Hoon Kim, Seoul (KR); Sang Kyoo Jeong, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 14/623,107

(22) Filed: Feb. 16, 2015

(65) Prior Publication Data
US 2015/0234610 A1  Aug. 20, 2015

(30) Foreign Application Priority Data
Feb. 17, 2014 (KR) .................. 10-2014-0017917

(51) Int. Cl.
*G06F 3/06* (2006.01)
*G11C 7/10* (2006.01)

(52) U.S. Cl.
CPC .......... *G06F 3/0619* (2013.01); *G06F 3/0661* (2013.01); *G06F 3/0665* (2013.01); *G06F 3/0679* (2013.01); *G06F 3/0689* (2013.01); *G06F 2206/1014* (2013.01)

(58) Field of Classification Search
CPC .... G06F 3/0689; G06F 3/0619; G06F 3/0661; G06F 3/0665; G06F 3/0679; G06F 2206/1014

USPC ..................................... 711/103; 713/1, 100
See application file for complete search history.

(56) References Cited

U.S. PATENT DOCUMENTS

| | | | |
|---|---|---|---|
| 6,823,329 B2 | 11/2004 | Kirk et al. | |
| 7,302,533 B2 | 11/2007 | Finnie et al. | |
| 7,464,088 B1 | 12/2008 | Chiang | |
| 7,596,560 B2 | 9/2009 | Rosengard | |
| 7,596,745 B2 | 9/2009 | Dignum et al. | |
| 7,660,793 B2 | 2/2010 | Indeck et al. | |
| 8,145,752 B2* | 3/2012 | Dee | G06F 17/30289 709/203 |
| 8,195,602 B2 | 6/2012 | Bakalash et al. | |
| 8,244,718 B2 | 8/2012 | Chamdani et al. | |
| 8,326,819 B2 | 12/2012 | Indeck et al. | |
| 9,015,283 B2* | 4/2015 | Srinivas | G06F 9/4451 709/204 |
| 2007/0022120 A1 | 1/2007 | Huang et al. | |

* cited by examiner

Primary Examiner — Jasmine Song
(74) Attorney, Agent, or Firm — Volentine & Whitt, PLLC

(57) ABSTRACT

A data storage device includes a central processing unit (CPU) executing an application and a hardware filter. A method of operation the data storage device may include initializing the hardware filter based on initialization information corresponding to a changed application when the application is changed so that the hardware filter supports the changed application, filtering read data that is output from a second memory based on filtering condition data, outputting the filtered data using the hardware filter that has been initialized, and transmitting the filtered data to a host via a first memory.

20 Claims, 18 Drawing Sheets

FIG. 7

| ADDRESS | DATA |
| --- | --- |
| ADR1 | Addr. of Page type (PT) |
| ADR2 | Addr. of num of row (NR) |
| ADR3 | Base addr. of row (BR) |
| ADR4 | Base addr. of offset (BO) |
| ADR5 | Size of offset (SO) |
| ADR6 | Address direction of offset (ADO) |

FIG. 8

| ADDRESS | DATA |
|---|---|
| ADR1 | Addr. of Page type (PT) |
| ADR2 | Addr. of num of row (NR) |
| ADR3 | Base addr. of row (BR) |
| ADR4 | Base addr. of offset (BO) |
| ADR5 | Size of offset (SO) |
| ADR6 | Address direction of offset (ADO) |
| ADR7 | Address direction of row (ADR) |

FIG. 9

```
SQL
SELECT   PID,NAME,CITY
FROM     PERSONS
WHERE    CITY='CITY1'
```

ALL-IN-ONE DATA STORAGE DEVICE INCLUDING INTERNATIONL HARDWARE FILTER, METHOD OF OPERATING THE SAME, AND SYSTEM INCLUDING THE SAME

CROSS-REFERENCE TO RELATED APPLICATIONS

A claim of priority under 35 U.S.C. §119(a) is made to Korean Patent Application No. 10-2014-0017917 filed on Feb. 17, 2014, the disclosure of which is hereby incorporated by reference in its entirety.

BACKGROUND

Embodiments of the present disclosure relate to a data storage device, and more particularly, to a device for initializing an internal hardware filter when an application is changed so that the hardware filter supports the application, a method of operating the same, and a system including the same.

Typically, in servers and data server systems including a database, a large quantity of data is stored in a relational database or NoSQL (Not only SQL) database. Data that includes data desired from among the large quantity of data is extracted from the relational database or the NoSQL database using a special purpose programming language such as a structured query language (SQL).

The extracted data is transmitted from a database to a main memory of a server, and a processor of the server retrieves the data from among the extracted data transmitted to and stored in the main memory. However, since only part of the extracted data stored in the main memory of the server is retrieved by the processor of the server, the data extraction process from the database is inefficient in terms of data traffic.

SUMMARY

Some embodiments of the present disclosure may provide a data storage device capable of initializing an internal hardware filter when an application is changed based on initialization information corresponding to a changed application without replacing the internal hardware filter, a method of operating the same, and a system including the same.

According to some embodiments of the present disclosure, a method of operating a data storage device which includes a central processing unit (CPU) executing an application and a hardware filter may be provided. The method may include initializing the hardware filter based on initialization information corresponding to a changed application when the application is changed so that the hardware filter supports the changed application, filtering read data that is output from a first memory based on filtering condition data, outputting the filtered data using the hardware filter that has been initialized, and transmitting the filtered data to a host via a second memory.

The initializing the hardware filter may include setting layout data related with a data format supported by the changed application in a register of the hardware filter.

The initializing the hardware filter may include receiving indication data indicating the data format corresponding to the changed application from the host, executing the changed application based on the indication data, and initializing the hardware filter based on the initialization information that is output from the CPU.

The executing the changed application may include selecting the changed application supporting the data format related with the indication data among a plurality of applications stored in the data storage device, and executing the changed application.

The plurality of applications may be stored in one of the first memory and the second memory.

The executing the changed application may include generating a confirmation signal indicating whether the data storage device is able to support the changed application supporting the data format related with the indication data, transmitting the confirmation signal to the host, receiving the changed application that is output from the host based on the confirmation signal, and executing the changed application.

The application may be firmware allowing the data storage device to support the data format corresponding to the application.

According to other embodiments of the present disclosure, an all-in-one data storage device may be provided. The all-in-one data storage device may include a CPU configured to execute an application, a first memory configured to output read data in response to a read command, an internal hardware filter configured to set layout data corresponding to a data format supported by a changed application based on initialization information that is output from the CPU when the application is changed configured to filter the read data based on the layout data and filtering condition data and configured to output the filtered data, a second memory, a host controller, and a memory controller configured to transmit the filtered data to the host controller using the second memory.

The all-in-one data storage device may further include a third memory configured to store a plurality of applications. The CPU may select the changed application supporting the data format among the plurality of applications based on indication data, which indicates the data format and has been output from a host, and the CPU may execute the changed application.

The first memory may be a flash memory, and the second memory may be a dynamic random access memory (DRAM). The all-in-one data storage device may be a solid state drive.

According to further embodiments of the present disclosure, a data processing system including the above-described all-in-one data storage device and a host configured to control an operation of the all-in-one data storage device may be provided.

The data processing system may be a database management system (DBMS).

BRIEF DESCRIPTION OF THE DRAWINGS

The above and other features and advantages of the present disclosure will become readily apparent from the detailed description that follows, with reference to the attached drawings, in which:

FIG. 7 is a diagram of layout data set in a configuration register illustrated in FIG. 5 according to some embodiments of the present disclosure;

FIG. 8 is a diagram of layout data set in the configuration register illustrated in FIG. 5 according to other embodiments of the present disclosure;

FIG. 9 is a diagram of a structured query language (SQL) used in the data processing system illustrated in FIG. 1 according to some embodiments of the present disclosure;

DETAILED DESCRIPTION OF THE EMBODIMENTS

Figure 1:
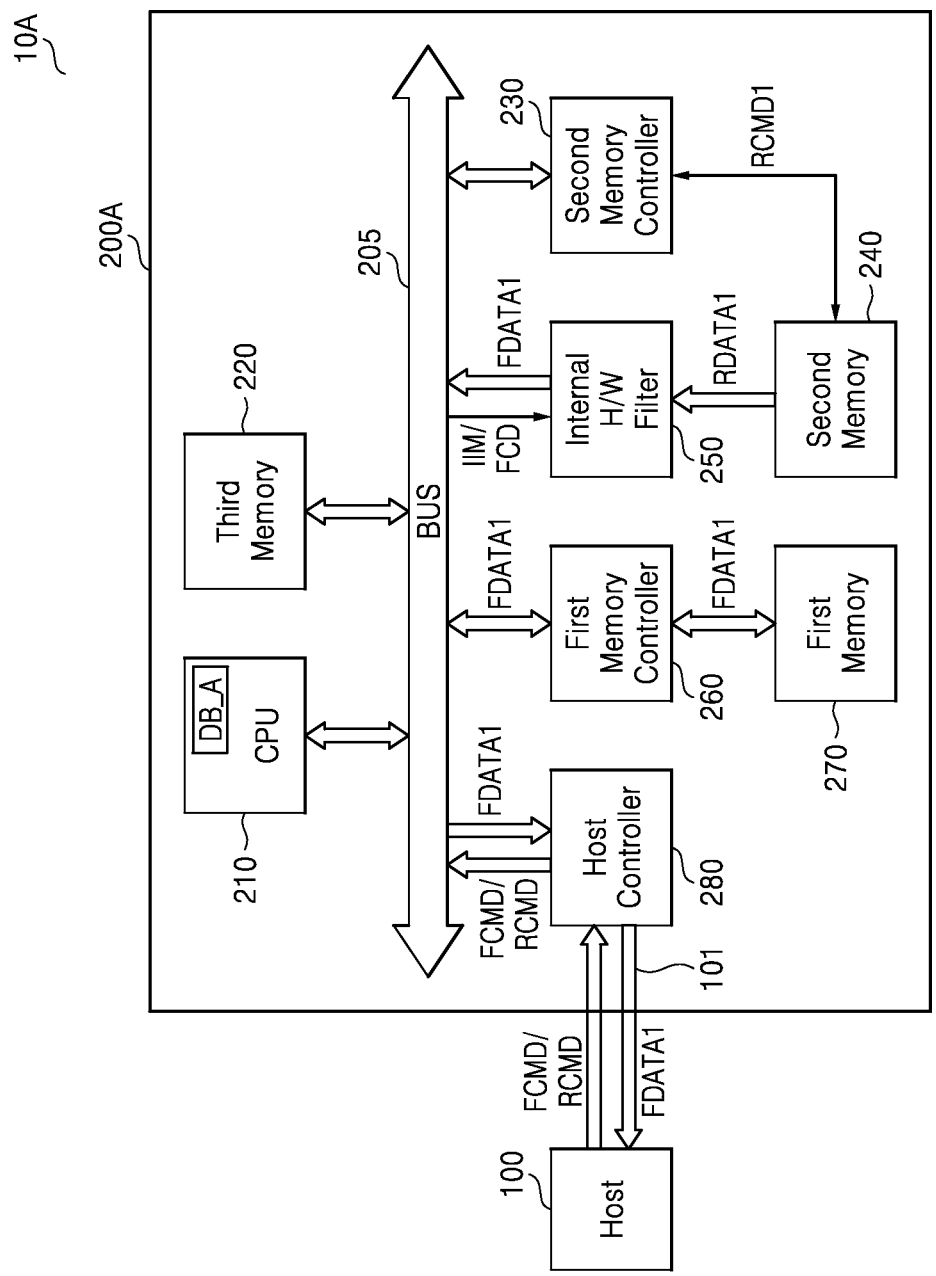
FIG. 1 is a block diagram of a data processing system according to some embodiments of the present disclosure.

The embodiments of the inventive concepts now will be described more fully hereinafter with reference to the accompanying drawings. The inventive concepts may, however, be embodied in many different forms and should not be construed as limited to the embodiments set forth herein. Rather, these embodiments are provided so that this disclosure will be thorough and complete, and will fully convey the scope of the present disclosure to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram of a data processing system according to some embodiments of the present disclosure. Referring to FIG. 1, a data processing system 10A may include a host 100 and a data storage device 200A. According to some embodiments, the data processing system 10A may be a database management system (DBMS). The DBMS may be a hierarchical DBMS, a network DBMS, a relational DBMS (RDBMS), an object-oriented DBMS, or an object-relational DBMS. The DBMS may include a column-oriented DBMS or a row-oriented DBMS. The DBMS may be MySQL, PostgreSQL, SQLite, Microsoft SQL Server, Microsoft Access, Oracle, SAP, dBASE, FoxPro, IBM DB2, and FilemakerPro.

The host 100 may control the overall operation of the data storage device 200A. For example, the host 100 may control a write operation, a read operation or a filtering operation of the data storage device 200A. The host 100 may output a filtering command FCMD and a read command RCMD to the data storage device 200A.

The data storage device 200A may include a bus 205, a central processing unit (CPU) 210, a third memory 220, a second memory controller 230, a second memory 240, a first internal hardware (H/W) filter 250, a first memory controller 260, a first memory 270, and a host controller 280.

The data storage device 200A may be implemented as an all-in-one data storage device. For example, the data storage device 200A may be implemented as a solid state drive (SSD) or a hard disc drive (HDD).

The CPU 210 may control the operations of the third memory 220, the second memory controller 230, the first internal H/W filter 250, the first memory controller 260, and the host controller 280. The CPU 210 may execute an application, e.g., a database application DB_A. At this time, the application may be firmware. Here, the database application may be a computer program aiming at entering and retrieving information from a computerized database.

In the present disclosure, the application is one that can manage data stored in a data storage device which will be described below. The application is described as the concept that includes various kinds of applications that can perform the same function as or a similar function to the database application.

When the application is changed, the CPU 210 may execute the changed application DB_A.

When the application is changed according to a type of data format, the first internal H/W filter 250 may be reconfigured using information related with the application.

In some embodiments, the data storage device 200A may support a data format (e.g., a database format) corresponding to the changed application DB_A. In other embodiments, the changed application DB_A may be stored in the first memory 270 or the second memory 240. In further embodiments, the changed application DB_A may be stored in the third memory 220.

When a target application is changed, the CPU 210 may transmit initialization information IIM corresponding to the changed application DB_A to the first internal H/W filter 250 such that the first internal H/W filter 250 can support the changed application DB_A. In other words, the first internal H/W filter 250 may be reconfigured using the initialization information IIM.

The CPU 210 may receive the filtering command FCMD from the host 100, interpret (or analyze) the filtering command FCMD, generate filtering condition data FCD based on an interpretation (analyzing) result, and transmit the generated filtering condition data FCD to the first internal H/W filter 250.

In some embodiments, the filtering command FCMD may include query or various commands requesting information from a database. In other embodiments, the filtering command FCMD may be a vendor-specific command. In further embodiments, the filtering command FCMD may include the read command RCMD. In other embodiments, the filtering condition data FCD may be programmed to the first internal H/W filter 250 using the changed application DB_A or an application programming interface (API).

The CPU 210 may generate a command based on the read command RCMD received from the host 100 and may output the command to the second memory controller 230.

The third memory 220 may be implemented as a volatile memory or a non-volatile memory. The volatile memory may be implemented as a dynamic random access memory (DRAM), a static RAM (SRAM), a thyristor RAM (T-RAM), a zero capacitor RAM (Z-RAM), or a twin transistor RAM (TTRAM). The non-volatile memory device may be implemented as an electrically erasable programmable read-only memory (EEPROM), a flash memory, a magnetic RAM (MRAM), a spin-transfer torque MRAM (STT-MRAM), a conductive bridging RAM (CBRAM), a ferroelectric RAM (FeRAM), a phase-change RAM (PRAM), a resistive RAM (RRAM), a nanotube RRAM, a polymer RAM (PoRAM), a nano floating gate memory (NFGM), a holographic memory, a molecular electronics memory device, or an insulator resistance change memory.

The second memory controller 230 may generate a first read command RCMD1 in response to a command that is output from the CPU 210, and may transmit the first read command RCMD1 to the second memory 240. The second memory 240 may output first read data RDATA1 to the first internal H/W filter 250 in response to the first read command RCMD1. The first read data RDATA1 may be big data.

The first read data RDATA1 may include metadata and/or data. For example, the metadata may include a header, an offset, and/or a pointer. Data in the first read data RDATA1 may be referred to as a row, a record, or a tuple. A column in the data may be referred to as a field or an attribute.

The second memory 240 may function as a database that stores data. The second memory 240 may be implemented as the non-volatile memory, e.g., a NAND flash array.

The first internal H/W filter 250 may be adaptively initialized based on the initialization information IIM, which corresponds to the changed target application DB_A and has been output from the CPU 210. In other words, when a target application is changed, the first internal H/W filter 250 may support the changed application DB_A based on the initialization information IIM corresponding to the changed application DB_A. The first internal H/W filter 250 that has been initialized may filter the first read data RDATA1 based on the filtering condition data FCD, and may output first filtered data FDATA1 to the bus 205.

Since the first internal H/W filter 250 is implemented within the data storage device 200A, the first internal H/W filter 250 may filter the first read data RDATA1 and transmit the first filtered data FDATA1 to the first memory 270, so that the traffic of the first filtered data FDATA1 transmitted from the second memory 240 to the first memory 270 is minimized.

In addition, since the first internal H/W filter 250 filters (or scans) the big data, e.g., the first read data RDATA1 in the vicinity of the second memory 240, the traffic of the big data transmitted from the second memory 240 to the first memory 270 can be decreased.

When the data storage device 200A is implemented as an SSD and the second memory 240 is implemented as a NAND flash memory, the first internal H/W filter 250 may be implemented close to the NAND flash memory, and therefore, data traffic in the SSD can be decreased.

The first memory controller 260 may receive the first filtered data FDATA1 from the first internal H/W filter 250 via the bus 205 and may store the first filtered data FDATA1 in the first memory 270. The first memory controller 260 may also read the first filtered data FDATA1 from the first memory 270 and may transmit the first filtered data FDATA1 to the host controller 280 via the bus 205. The first memory 270 may store the first filtered data FDATA1. The first memory 270 may be implemented as a volatile memory.

The host 100 and the data storage device 200A may communicate data (or a signal) and/or a command with each other via the host controller 280. The host controller 280 may transmit the first filtered data FDATA1 to the host 100 via a signal line 101. For example, the signal line 101 may be implemented as an electrical signal line or an optical signal line. The signal line 101 may include at least one signal lines.

Figure 2:
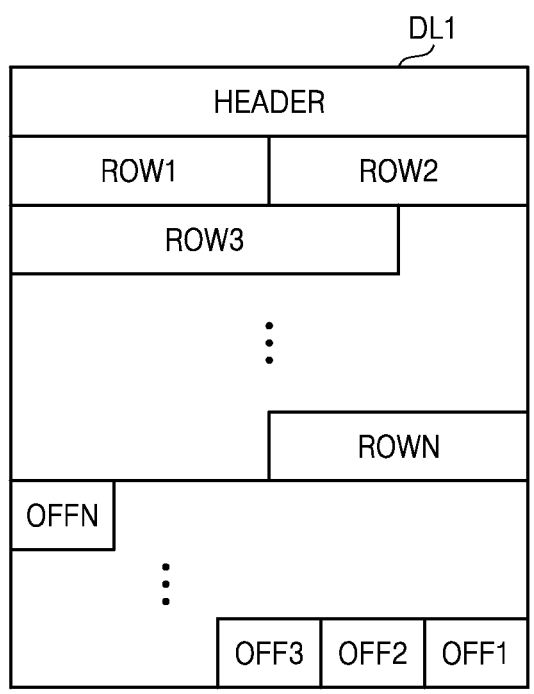
FIG. 2 is a diagram of a data storage format in a database according to some embodiments of the present disclosure.
Figure 3:
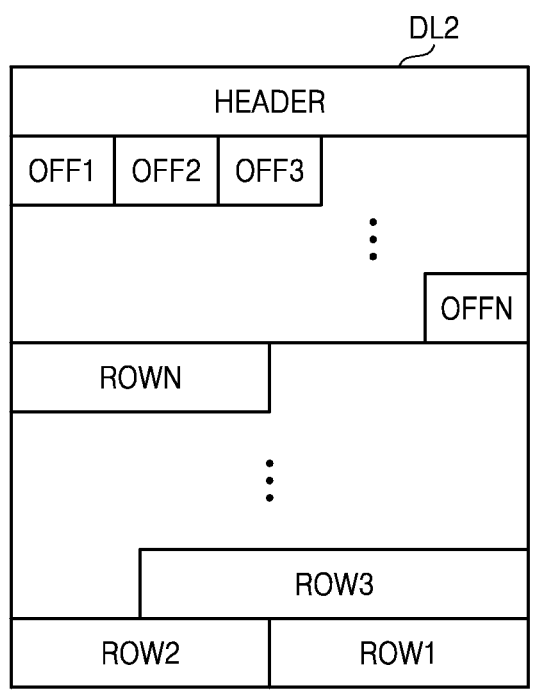
FIG. 3 is a diagram of a data storage format in a database according to other embodiments of the present disclosure.
Figure 4:
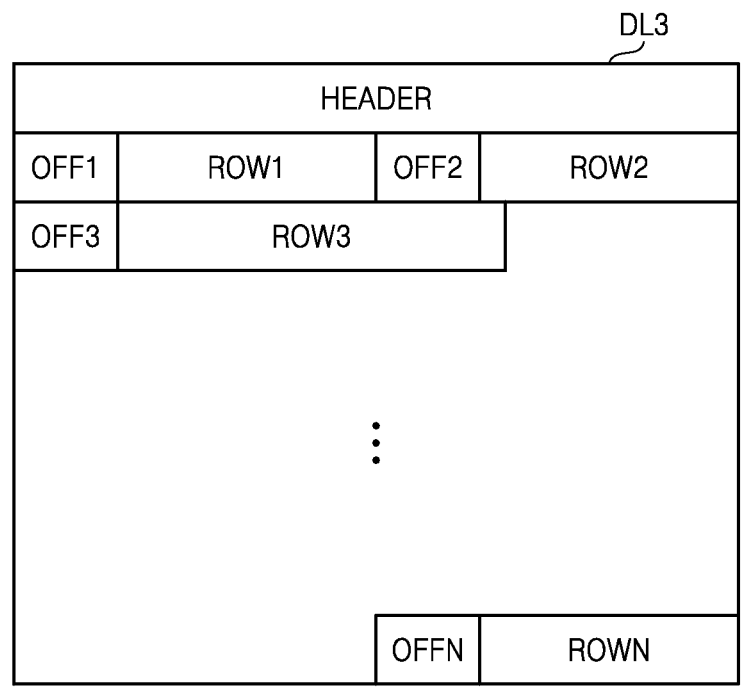
FIG. 4 is a diagram of a data storage format in a database according to further embodiments of the present disclosure.

FIG. 2 is a diagram of a data storage format in a database according to some embodiments of the present disclosure. FIG. 3 is a diagram of a data storage format in a database according to other embodiments of the present disclosure. FIG. 4 is a diagram of a data storage format in a database according to further embodiments of the present disclosure. FIGS. 2 through 4 show data formats (or database formats), i.e., data storage formats supported by an application. Although three data storage formats are illustrated in FIGS. 2 through 4, the present disclosure is not restricted to these embodiments.

Referring to FIGS. 1 through 4, data that is output from the host 100 may be stored in the second memory 240 in a data (or database) format supported by an application. In other words, the first read data RDATA1 may be stored in the second memory 240 in any one of the data storage formats respectively illustrated in FIGS. 2 through 4.

A first data layout DL1 stored in a first database (e.g., the second memory 240) may be different from a second data layout DL2 stored in a second database (e.g., the second memory 240). For example, positions (e.g., storage positions) of a header HEADER, rows ROW1 through ROWN (where N is a natural number), and row offsets OFF1 through OFFN may vary with data layouts DL1 through DL3. Here, each of the rows ROW1 through ROWN may indicate data.

In addition, an increasing direction of an address of the rows ROW1 through ROWN and an increasing direction of an address of the row offsets OFF1 through OFFN may vary with the data layouts DL1 through DL3. Accordingly, the first internal H/W filter 250 may be adaptively initialized based on the initialization information IIM corresponding to the changed application DB_A that is output from the CPU 210 so that the first internal H/W filter 250 can support a data format (or database format), e.g., the data layout DL1, DL2, or DL3, corresponding to the changed application DB_A.

Figure 5:
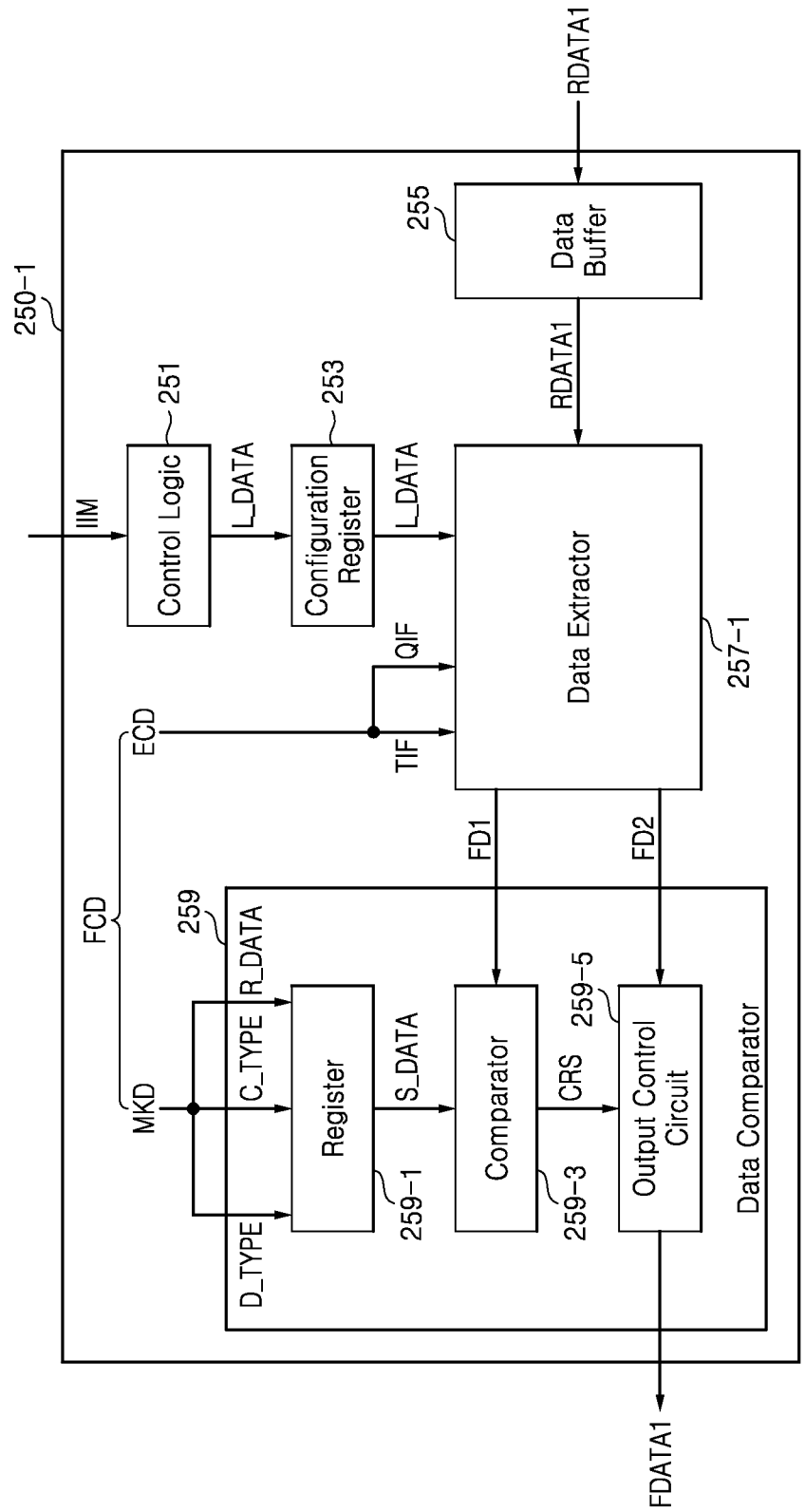
FIG. 5 is a diagram of an example of a first internal hardware (H/W) filter illustrated in FIG. 1.

FIG. 5 is a diagram of an example 250-1 of the first internal H/W filter 250 illustrated in FIG. 1. Referring to FIGS. 1 through 5, the first internal H/W filter 250-1 may include a control logic 251, a configuration register 253, a data buffer 255, a data extractor 257-1 and a data comparator 259.

The control logic 251 may control the overall operation, e.g., filtering and/or initialization, of the first internal H/W filter 250-1. In other words, the control logic 251 may control operations of the configuration register 253, the data buffer 255, the data extractor 257-1 and the data comparator 259. The control logic 251 may extract from the initialization information IIM a data layout, e.g., layout data L_DATA corresponding to a data format supported by the changed application DB_A, and may set the layout data L_DATA in the configuration register 253.

The configuration register 253 may store the layout data L_DATA and may transmit the stored layout data L_DATA to the data extractor 257-1. The configuration register 253 may be implemented as an SRAM that can function as a data buffer. The layout data L_DATA related with the data format supported by a changed application may be set in the configuration register 253.

FIG. 7 is a diagram of layout data set in the configuration register 253 illustrated in FIG. 5 according to some embodiments of the present disclosure. FIG. 8 is a diagram of layout data set in the configuration register 253 illustrated in FIG. 5 according to other embodiments of the present disclosure.

Referring to FIGS. 1 through 8, the layout data L_DATA may include data PT, NR, BR, BO, SO, and ADO respectively stored at areas corresponding to addresses ADR1 through ADR6. The data PT corresponding to (or stored in an area corresponding to) the first address ADR1 may be address data regarding a field to which a page type is written. The page type may be data for distinguishing an index page from a data page. The data NR corresponding to (or stored in an area corresponding to) the second address ADR2 may be address data regarding a field to which the number of rows, e.g., data items is written.

The data BR corresponding to (or stored in an area corresponding to) the third address ADR3 may be start address data about a start address to which a row or data is written. The data BO corresponding to (or stored in an area corresponding to) the fourth address ADR4 may be base address data about a base address to which a row offset is written.

The data SO corresponding to (or stored in an area corresponding to) the fifth address ADR5 may be size data regarding a field to which the row offset is written. The data ADO corresponding to (or stored in an area corresponding to) the sixth address ADR6 may be data about an address increasing direction of an offset.

Referring to FIG. 8, the layout data L_DATA may also include data ADR stored at an address ADR7 of the configuration register 253. The data ADR corresponding to (or stored in an area corresponding to) the seventh address ADR7 may be data about an address increasing direction of a row, e.g., data.

In other words, the layout data L_DATA may include data used to parse data (e.g., columns or fields included in a row) in the first read data RDATA1 stored in a data format, e.g., data layout supported by the changed application DB_A.

When an application is changed, the first internal H/W filter 250 may set the layout data L_DATA corresponding to a data format supported by the changed application DB_A based on the initialization information IIM corresponding to the changed application DB_A. Accordingly, when the application is changed, the data storage device 200A may initialize the first internal H/W filter 250 based on the initialization information IIM corresponding to the changed application DB_A without replacing or modifying the first internal H/W filter 250.

The data buffer 255 may buffer the first read data RDATA1 received from the second memory 240. For example, the data buffer 255 may buffer page data. The data buffer 255 may be implemented as an SRAM.

The data extractor 257-1 may parse columns included in a row of the first read data RDATA1 using the layout data L_DATA and extraction condition data ECD included in the filtering condition data FCD. The data extractor 257-1 may extract first extraction data FD1 and second extraction data FD2 based on a parsing result. The extraction condition data ECD may include identification data TIF for identifying a column and column extraction data QIF for extracting a column that is to be a comparison target.

The data comparator 259 may compare matching key data MKD included in the filtering condition data FCD with the first extraction data FD1, and may decide whether to output the second extraction data FD2 as the first filtered data FDATA1 based on a comparison result.

The data comparator 259 may include a register 259-1, a comparator 259-3, and an output control circuit 259-5.

The register 259-1 may store the matching key data MKD. The register 259-1 may be implemented as an SRAM that functions as a data buffer. The matching key data MKD may include type indication data D_TYPE indicating a data type, an operator indication data C_TYPE indicating a type of operator, and extraction indication data R_DATA indicating data (e.g., a column value or a field value) that is to be actually extracted.

The data type may be classification for identifying each of various data types. For example, the data types may include integers, Booleans, characters, floating-point numbers, and alphanumeric strings.

The operator type may include "equal (=)", "not equal (< > or !=)", "greater than (>)", "less than (<)", "greater than or equal (<=)", and "less than or equal (<=)".

The comparator 259-3 may compare reference data S_DATA that is output from the register 259-1 with the first extraction data FD1, and may generate a comparison signal CRS based on a comparison result. The comparator 259-3 may include a plurality of comparators. The reference data S_DATA may be generated based on all or part of the matching key data MKD.

The output control circuit 259-5 may decide whether to output the second extraction data FD2 in response to the comparison signal CRS. For example, when the operator indication data C_TYPE indicates "equal (=)" and the extraction indication data R_DATA included in the reference data S_DATA is the same as the first extraction data FD1, the output control circuit 259-5 may output the second extraction data FD2 as the first filtered data FDATA1. In otherwise cases, the output control circuit 259-5 may not output the second extraction data FD2.

Figure 6:
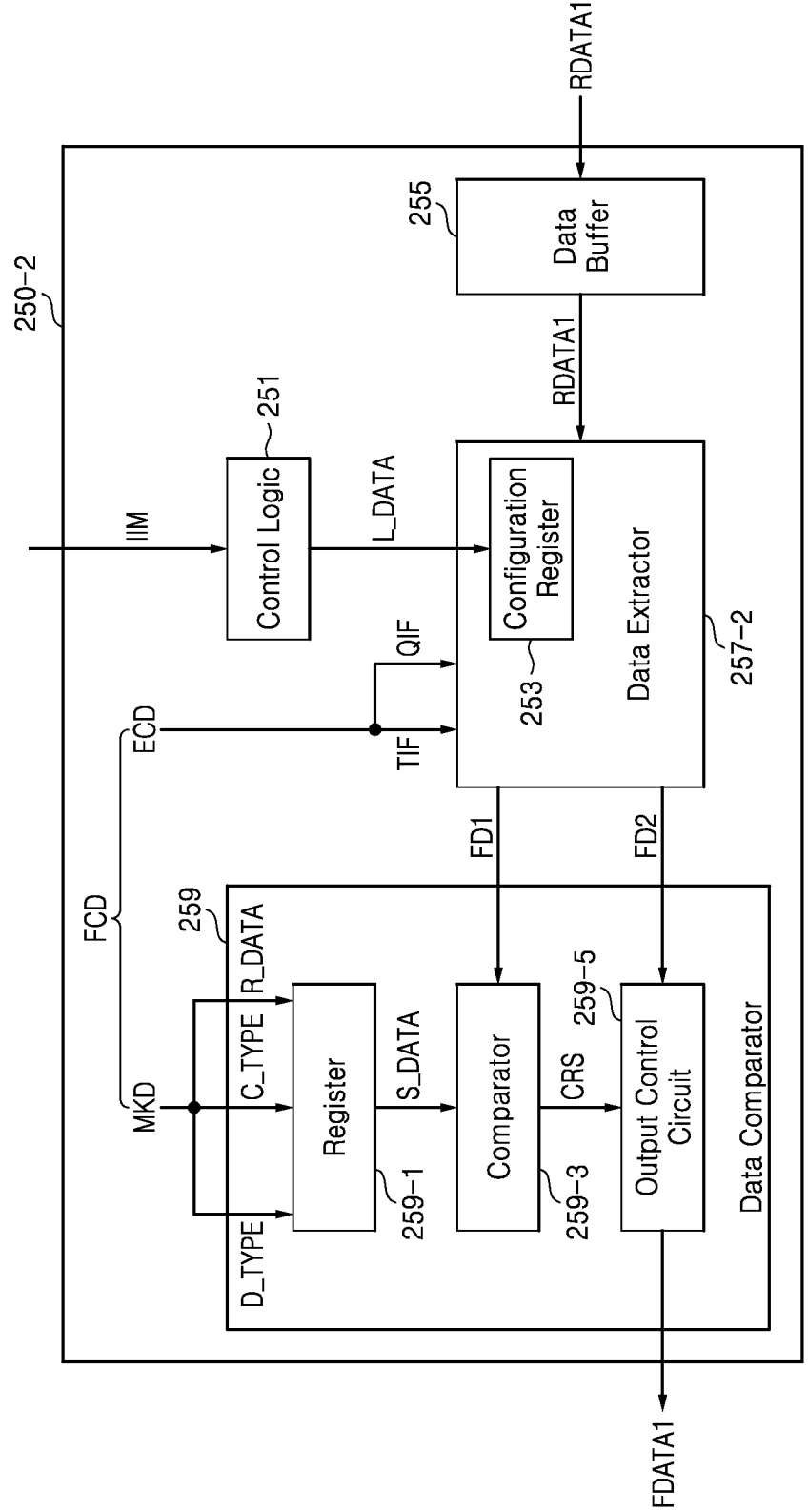
FIG. 6 is a diagram of another example of the first internal H/W filter illustrated in FIG. 1.

FIG. 6 is a diagram of another example 250-2 of the first internal H/W filter 250 illustrated in FIG. 1. Referring to FIG. 6, structure and operations of the first internal H/W filter 250-2 illustrated in FIG. 6 may be substantially the same or similar as those of the first internal H/W filter 250-1 illustrated in FIG. 5, with the exception that the configuration register 253 is implemented within a data extractor 257-2.

FIG. 9 is a diagram of a structured query language (SQL) used in the data processing system 10A illustrated in FIG. 1 according to some embodiments of the present disclosure. Referring to FIG. 9, the SQL is a special-purpose programming language designed to manage data stored in a DBMS.

Column names, i.e., PID, NAME, and CITY may indicate a column list, PERSONS may indicate a table, and CITY='CITY1' may indicate a column operator value.

Figure 10:
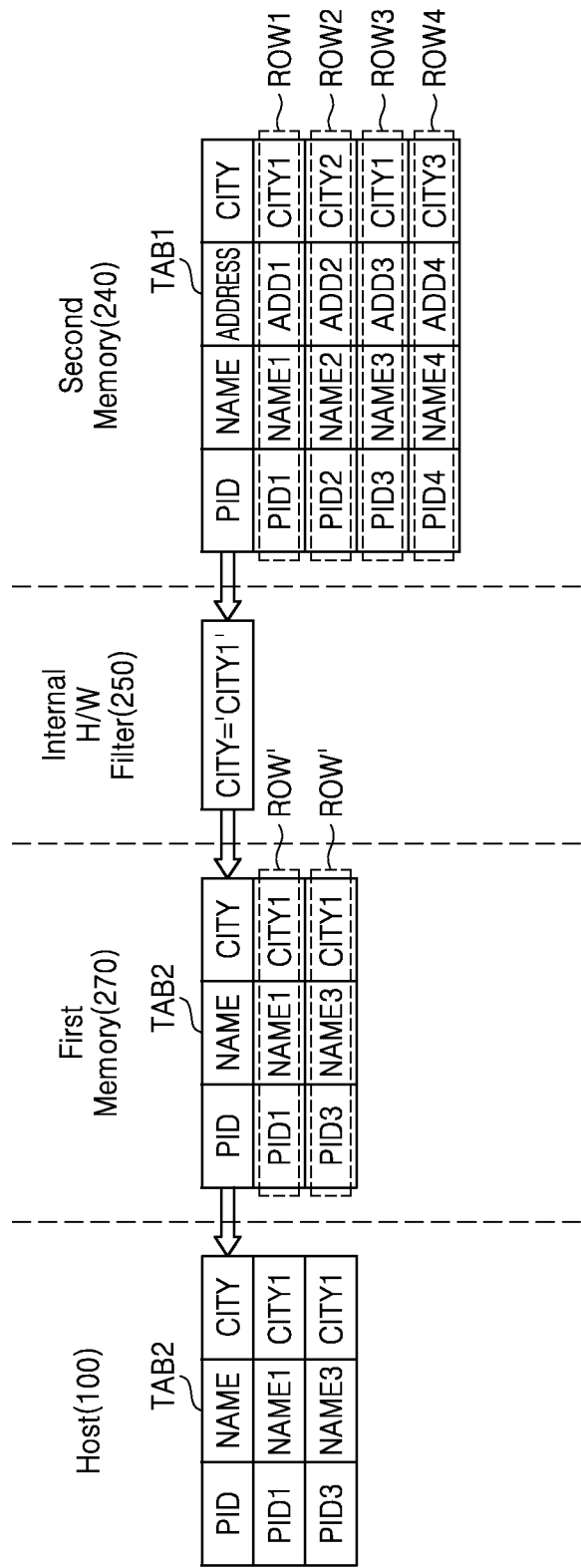
FIG. 10 is a diagram explaining operations of the data processing system illustrated in FIG. 1 according to some embodiments of the present disclosure.

FIG. 10 is a diagram explaining operations of the data processing system 10A illustrated in FIG. 1 according to some embodiments of the present disclosure. For clarity of the description, an operation of the data storage device 200A in the embodiments illustrated in FIG. 10 will be described based on the SQL illustrated in FIG. 9, but the data storage device 200A may operate based on a query defined by a manufacturer.

Referring to FIGS. 1 through 10, when an application is changed, the CPU 210 may execute the changed application DB_A. The CPU 210 may transmit the initialization information IIM corresponding to the changed application DB_A to the first internal H/W filter 250.

The first internal H/W filter 250 may set the layout data L_DATA corresponding to a data format supported by the changed application DB_A based on the initialization information IIM. The CPU 210 may receive the filtering command FCMD from the host 100, interpret (or analyze) the filtering command FCMD, generate the filtering condition data FCD based on the interpretation (analyzing) result, and transmit the filtering condition data FCD to the first internal H/W filter 250.

According to the SQL illustrated in FIG. 9, the type indication data D_TYPE indicates characters, the operator indication data C_TYPE indicates "equal (=)", the extraction indication data R_DATA indicates a column value of CITY1. Also, the identification data TIF includes data for identifying a column name, PID, NAME, or CITY to be extracted among column names, PID, NAME, ADDRESS, and CITY included in a table TAB1. The column extraction data QIF indicates a name, i.e., CITY of a column to be extracted.

The second memory 240 may output the table TAB1 as the first read data RDATA1 to the first internal H/W filter 250 in response to the first read command RCMD1. For clarity of the description, the table TAB1 illustrated in FIG. 10 includes rows ROW1 through ROW4 unlike the data storage formats illustrated in FIGS. 2 through 4.

The data buffer 255 of the first internal H/W filter 250 may receive the table TAB1 from the second memory 240 and may buffer the rows ROW1 through ROW4 included in the table TAB1. The data buffer 255 may output the buffered table TAB1 as the first read data RDATA1 to the data extractor 257-1. In other words, the data extractor 257-1 or 257-2 may read necessary data from the data buffer 255.

The data extractor 257-1 may parse the column names, PID, NAME, ADDRESS, and CITY, included in the first row ROW1 based on the identification data TIF, the column extraction data QIF, and the layout data L_DATA. The data extractor 257-1 may extract column values, PID1, NAME1, and CITY1 based on a parsing result.

The data extractor 257-1 may transmit the column value, CITY1, included in the column, CITY, in order to be extracted to the comparator 259-3 as the first extraction data FD1. The data extractor 257-1 may also transmit the second extraction data FD2 including the column values, PID1, NAME1, and CITY1, to the output control circuit 259-5.

The comparator 259-3 may compare the column value, CITY1, included in the reference data S_DATA with the column value, CITY1, corresponding to the first extraction data FD1, and may output the comparison signal CRS indicating an agreement based on a comparison result.

The output control circuit 259-5 may output the second extraction data FD2 including the column values, PID1, NAME1, and CITY1, to the bus 205 as the first filtered data FDATA1 in response to the comparison signal CRS indicating the agreement. The first memory controller 260 may store a row ROW1' including the column values, PID1, NAME1, and CITY1, in the first memory 270.

Continuously, the data extractor 257-1 may parse the column names, PID, NAME, ADDRESS, and CITY, included in the second row ROW2 based on the identification data TIF, the column extraction data QIF, and the layout data L_DATA. The data extractor 257-1 may extract column values, PID2, NAME2, and CITY2 based on a parsing result. The data extractor 257-1 may transmit the column value, CITY2, included in the column, CITY, in order to be extracted to the comparator 259-3 as the first extraction data FD1. The data extractor 257-1 may also transmit the second extraction data FD2 including the column values, PID2, NAME2, and CITY2, to the output control circuit 259-5.

The comparator 259-3 may compare the column value, CITY1, included in the reference data S_DATA with the column value, CITY2, corresponding to the first extraction data FD1, and may output the comparison signal CRS indicating a disagreement based on a comparison result. The output control circuit 259-5 may not output the second extraction data FD2 including the column values, PID2, NAME2, and CITY2, to the bus 205 as the first filtered data FDATA1 in response to the comparison signal CRS indicating the disagreement.

Continuously, the data extractor 257-1 may parse the column names, PID, NAME, ADDRESS, and CITY, included in the third row ROW3 based on the identification data TIF, the column extraction data QIF, and the layout data L_DATA. The data extractor 257-1 may extract column values, PID3, NAME3, and CITY1 based on a parsing result.

The data extractor 257-1 may transmit the column value, CITY1, included in the column, CITY, in order to be extracted to the comparator 259-3 as the first extraction data FD1. The data extractor 257-1 may also transmit the second extraction data FD2 including the column values, PID3, NAME3, and CITY1, to the output control circuit 259-5.

The comparator 259-3 may compare the column value, CITY1, included in the reference data S_DATA with the column value, CITY1, corresponding to the first extraction data FD1, and may output the comparison signal CRS indicating an agreement based on a comparison result. The output control circuit 259-5 may output the second extraction data FD2 including the column values, PID3, NAME3, and CITY1, to the bus 205 as the first filtered data FDATA1 in response to the comparison signal CRS indicating the agreement. The first memory controller 260 may store a row ROW3' including the column values, PID3, NAME3, and CITY1, in the first memory 270.

Continuously, the data extractor 257-1 may parse the column names, PID, NAME, ADDRESS, and CITY, included in the fourth row ROW4 based on the identification data TIF, the column extraction data QIF, and the layout data L_DATA. The data extractor 257-1 may extract column values, PID4, NAME4, and CITY3 based on a parsing result. The data extractor 257-1 may transmit the column value, CITY3, included in the column, CITY, in order to be extracted to the comparator 259-3 as the first extraction data FD1. The data extractor 257-1 may also transmit the second extraction data FD2 including the column values, PID4, NAME4, and CITY3, to the output control circuit 259-5.

The comparator 259-3 may compare the column value, CITY1, included in the reference data S_DATA with the column value, CITY3, corresponding to the first extraction data FD1, and may output the comparison signal CRS indicating a disagreement based on a comparison result. The output control circuit 259-5 may not output the second extraction data FD2 including the column values, PID4, NAME4, and CITY3, to the bus 205 as the first filtered data FDATA1 in response to the comparison signal CRS indicating the disagreement.

A table TAB2 generated by the first memory controller 260 may be stored in the first memory 270. Thereafter, the first memory controller 260 may read the table TAB2 from the first memory 270, and then may transmit the table TAB2 to the host controller 280 via the bus 205. The host controller 280 may transmit the table TAB2 including the column value, CITY1, based on the SQL illustrated in FIG. 9 to the host 100.

Figure 11:
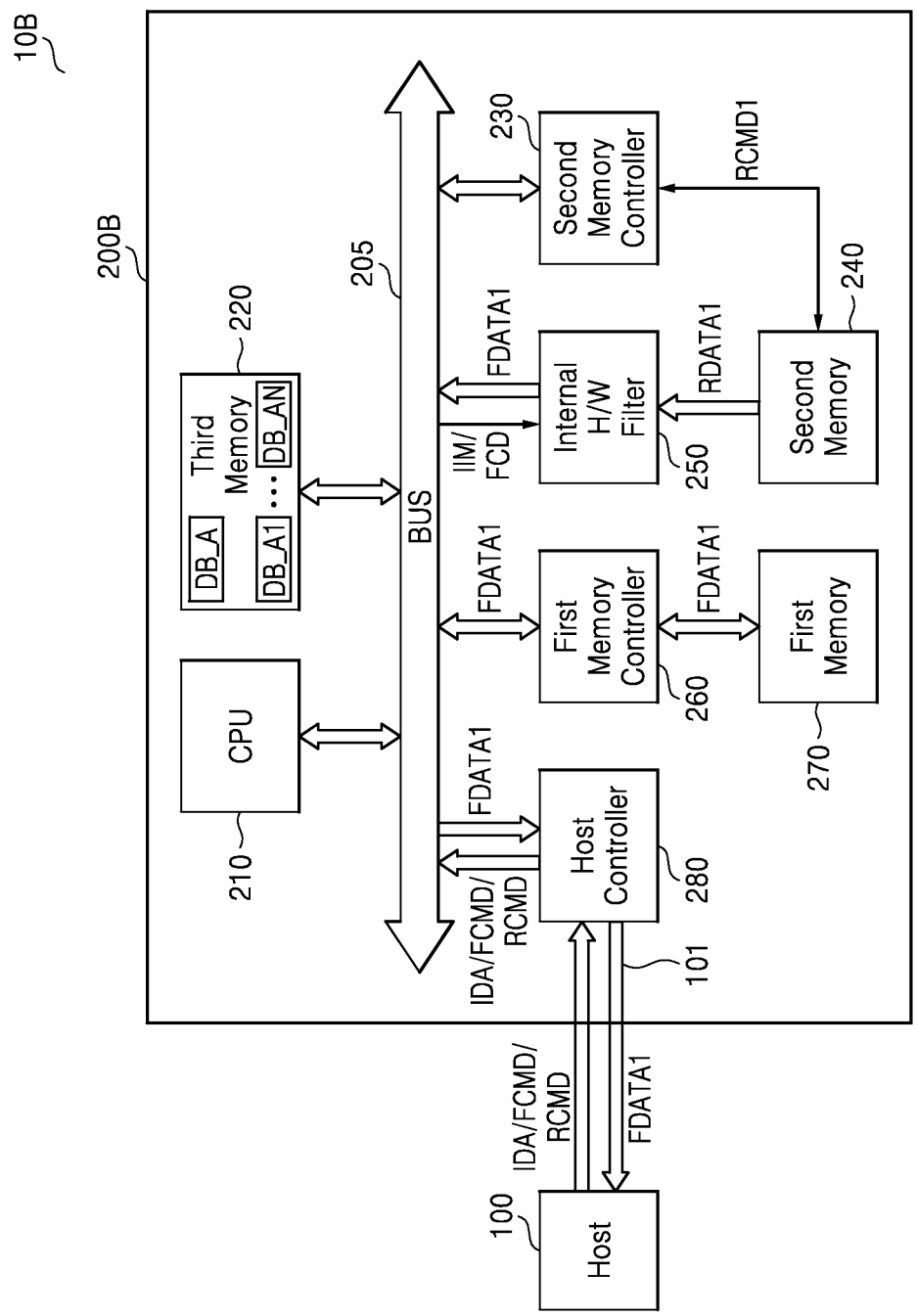
FIG. 11 is a block diagram of a data processing system according to other embodiments of the present disclosure.

FIG. 11 is a block diagram of a data processing system 10B according to other embodiments of the present disclosure. Referring to FIG. 11, the data processing system 10B may include the host 100 and a data storage device 200B. Except for the partial operation of the CPU 210 and the third memory 220 in the data storage device 200B illustrated in FIG. 11, structure and operations of the data storage device 200B may be substantially the same as those of the data storage device 200A illustrated in FIG. 1.

The host 100 may control the operation of the data storage device 200B. When an application is changed, the data storage device 200B may adaptively initialize the first internal H/W filter 250 based on the initialization information IIM corresponding to the changed application DB_A so that the first internal H/W filter 250 can support the changed application DB_A.

The host 100 may output to the data storage device 200B indication data IDA indicating a data format corresponding to the changed application DB_A. In other embodiments, the indication data IDA may be included in the filtering command FCMD.

The CPU 10 may control operations of the third memory 220, the second memory controller 230, the first internal H/W filter 250, the first memory controller 260 and the host controller 280. The CPU 210 may execute the changed application DB_A based on the indication data IDA. For example, the CPU 210 may select and execute the changed application DB_A that supports a data format related with the indication data IDA among a plurality of applications DB_A through DB_AN stored in the third memory 220. In other embodiments, the applications DB_A through DB_AN may be stored in the first memory 270 or the second memory 240.

When the application is changed, the CPU 210 may transmit to the first internal H/W filter 250 the initialization information IIM corresponding to the changed application DB_A so that the first internal H/W filter 250 can support the changed application DB_A. The first internal H/W filter 250 may set the layout data L_DATA corresponding to the data format supported by the changed application DB_A based on the initialization information IIM. In other words, the first internal H/W filter 250 may be adaptively initialized based on the initialization information IIM, which corresponds to the changed application DB_A and has been output from the CPU 210.

Figure 12:
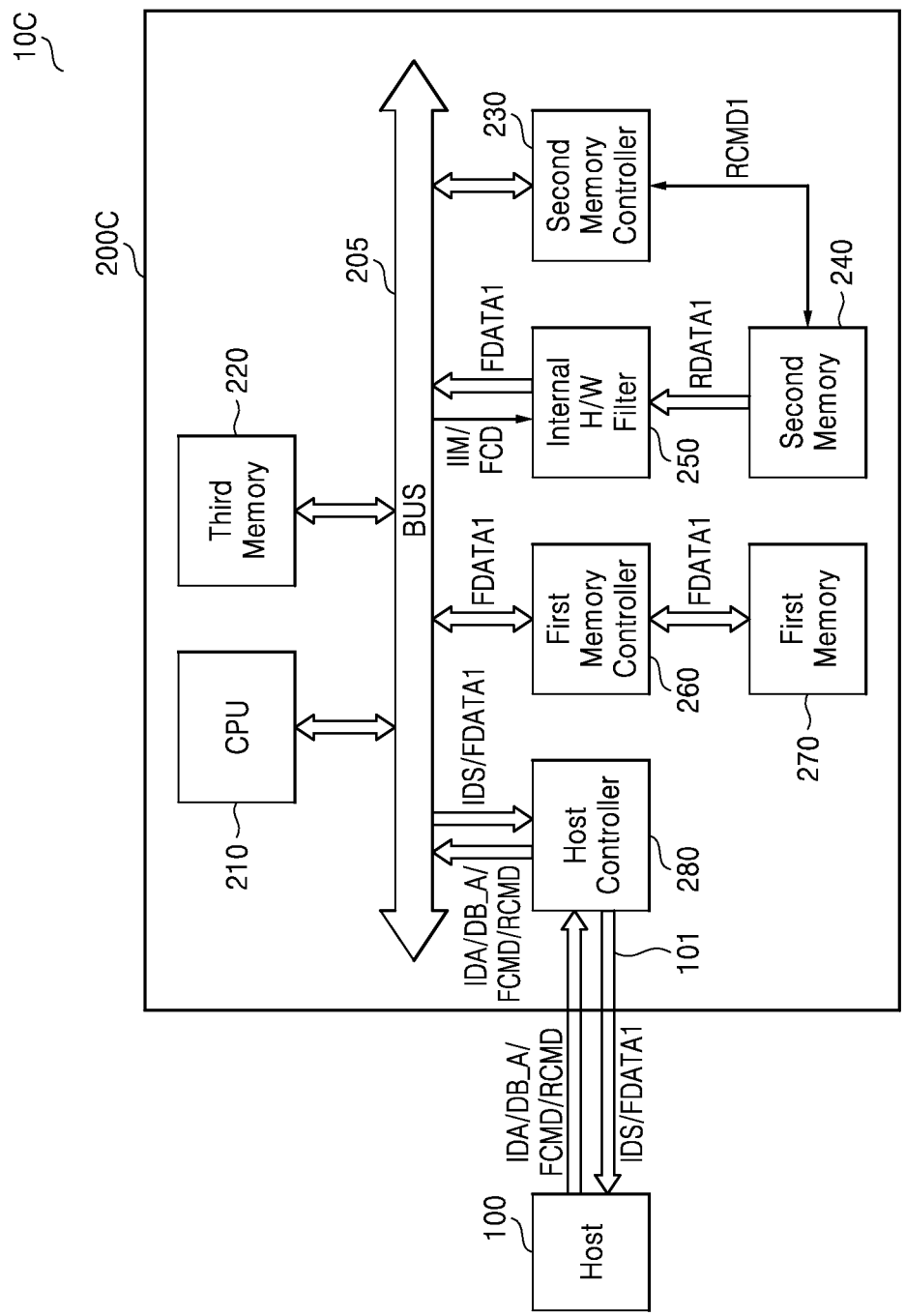
FIG. 12 is a block diagram of a data processing system according to further embodiments of the present disclosure.

FIG. 12 is a block diagram of a data processing system 10C according to further embodiments of the present disclosure. Referring to FIG. 12, the data processing system 10C may include the host 100 and a data storage device 200C. Except for the partial operation of the CPU 210 in the data storage device 200C illustrated in FIG. 12, structure and operations of the data storage device 200C may be substantially the same as those of the data storage device 200A illustrated in FIG. 1.

The host 100 may control the operation of the data storage device 200C. When an application is changed, the data storage device 200C may adaptively initialize the first internal H/W filter 250 based on the initialization information IIM corresponding to the changed application DB_A so that the first internal H/W filter 250 can support the changed application DB_A.

The host 100 may output to the data storage device 200C indication data IDA indicating a data format corresponding to the changed application DB_A. In other embodiments, the indication data IDA may be included in the filtering command FCMD.

The CPU 10 may control operations of the third memory 220, the second memory controller 230, the first internal H/W filter 250, the first memory controller 260 and the host controller 280. The CPU 210 may execute the changed application DB_A based on the indication data IDA. For example, the CPU 210 may generate a confirmation signal IDS indicating whether the data storage device 200C supports the changed application DB_A that supports the data format related with the indication data IDA, and the CPU 210 may transmit the confirmation signal IDS to the host 100.

The CPU 210 may receive the changed application DB_A that has been output from the host 100 based on the confirmation signal IDS, and may execute the changed application DB_A. In other words, the host 100 may transmit the changed application DB_A to the data storage device 200C in response to the confirmation signal IDS indicating that the data storage device 200C cannot support the changed application DB_A. In some embodiments, the changed application DB_A that is output from the host 100 may be stored in the first memory 270 or the second memory 240. In other embodiments, the changed application DB_A that is output from the host may be stored in the third memory 220.

When the application is changed, the CPU 210 may transmit to the first internal H/W filter 250 the initialization information IIM corresponding to the changed application DB_A so that the first internal H/W filter 250 can support the changed application DB_A. The first internal H/W filter 250 may set the layout data L_DATA corresponding to the data format supported by the changed application DB_A based on the initialization information IIM. In other words, the first internal H/W filter 250 may be adaptively initialized based on the initialization information IIM, which corresponds to the changed application DB_A and has been output from the CPU 210.

Figure 13:
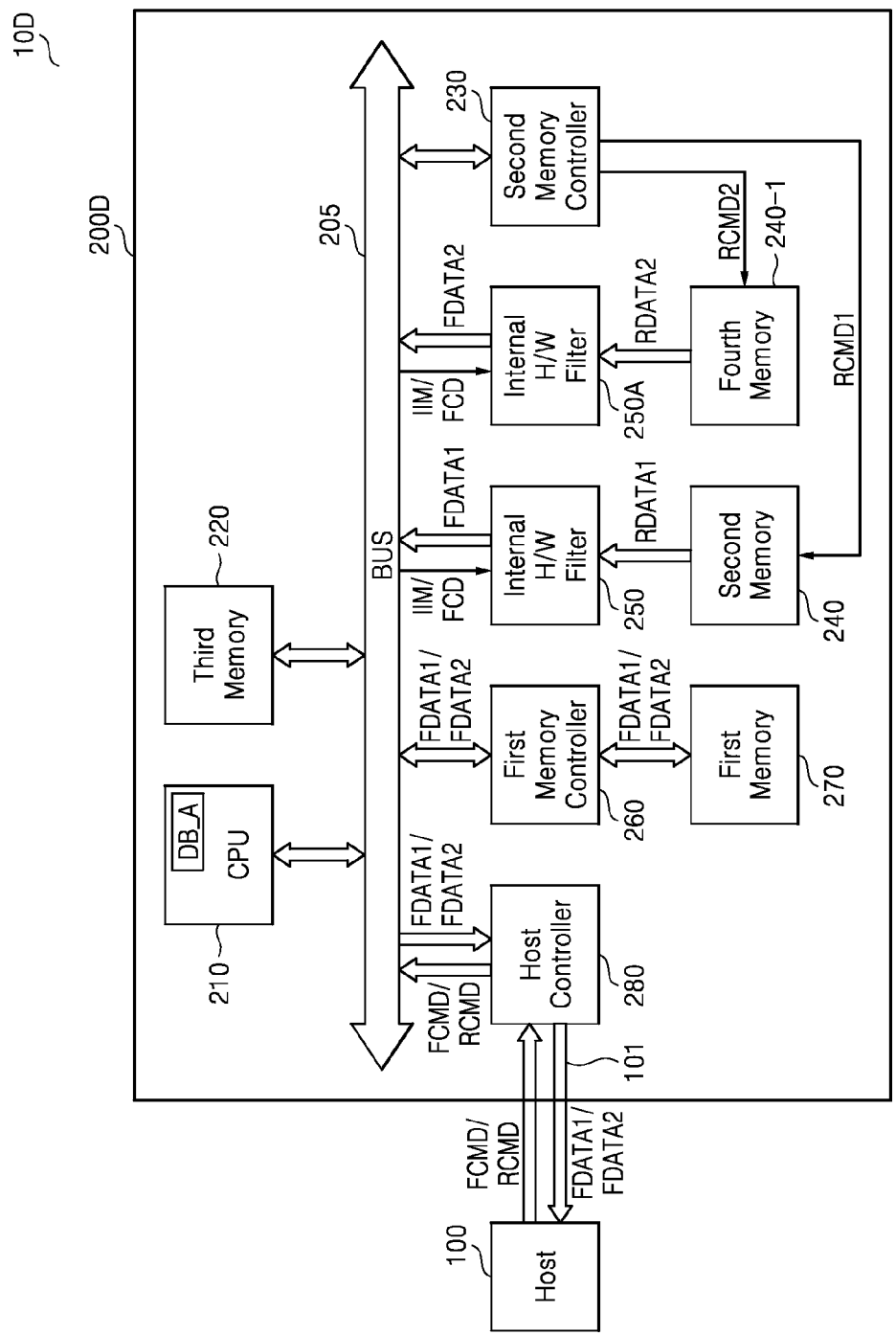
FIG. 13 is a block diagram of a data processing system according to other embodiments of the present disclosure.

FIG. 13 is a block diagram of a data processing system 10D according to other embodiments of the present disclosure. Referring to FIG. 13, the data processing system 10D may include the host 100 and a data storage device 200D. The host 100 may control the operation of the data storage device 200D. The data storage device 200D illustrated in FIG. 13 may also include a fourth memory 240-1 and a second internal H/W filter 250A in addition to the elements 210, 220, 230, 240, 250, 260, 270, and 280 of the data storage device 200A illustrated in FIG. 1.

Except for the fourth memory 240-1 and the second internal H/W filter 250A, structure and operations of the data storage device 200D illustrated in FIG. 13 may be substantially the same as those of the data storage device 200A illustrated in FIG. 1. Structure and operations of the second internal H/W filter 250A may be substantially the same as those of the first internal H/W filter 250.

For clarity of the description, the two internal H/W filters 250 and 250A respectively corresponding to two memories (e.g., an auxiliary memories 240 and 240-1) are illustrated in FIG. 13, but the present disclosure is not restricted to the current embodiments. In other embodiments, an internal H/W filter may be provided for each channel or each auxiliary memory.

The host 100 may output the filtering command FCMD and the read command RCMD to the data storage device 200D. The CPU 210 may execute the changed application DB_A whenever an application is changed. When the application is change, the CPU 210 may transmit to the internal H/W filters 250 and 250A the initialization information IIM corresponding to the changed application DB_A so that the internal H/W filters 250 and 250A can support the changed application DB_A. The internal H/W filters 250 and 250A may set the layout data L_DATA corresponding to a data format supported by the changed application DB_A based on the initialization information IIM.

The CPU 210 may receive the filtering command FCMD from the host 100, interpret the filtering command FCMD, generate the filtering condition data FCD based on an interpretation result, and transmit the filtering condition data FCD to the internal H/W filters 250 and 250A. The CPU 210 may generate a command based on the read command RCMD received from the host 100 and may output the generated command to the second memory controller 230.

The second memory controller 230 may generate a first read command RCMD1 and a second read command RCMD2 in response to the command generated by the CPU 210, and may transmit the first read command RCMD1 and the second read command RCMD2 to the second memory 240 and the fourth memory 240-1, respectively. The second memory 240 may transmit first read data RDATA1 to the first internal H/W filter 250 in response to the first read command RCMD1.

The first internal H/W filter 250 may filter the first read data RDATA1 based on the layout data L_DATA and the filtering condition data FCD, and may output the first filtered data FDATA1 to the bus 205. The first memory controller 260 may store the first filtered data FDATA1 in the first memory 270.

The fourth memory 240-1 may transmit second read data RDATA2 to the second internal H/W filter 250A in response to the second read command RCMD2. The second internal H/W filter 250A may filter the second read data RDATA2 based on the layout data L_DATA and the filtering condition data FCD, and may output the second filtered data FDATA2 to the bus 205.

The first memory controller 260 may store the second filtered data FDATA2 in the first memory 270. The first memory controller 260 may transmit the first filtered data FDATA1 and the second filtered data FDATA2 to the bus 205. The host controller 280 may transmit the first filtered data FDATA1 and the second filtered data FDATA2 to the host 100.

Figure 14:
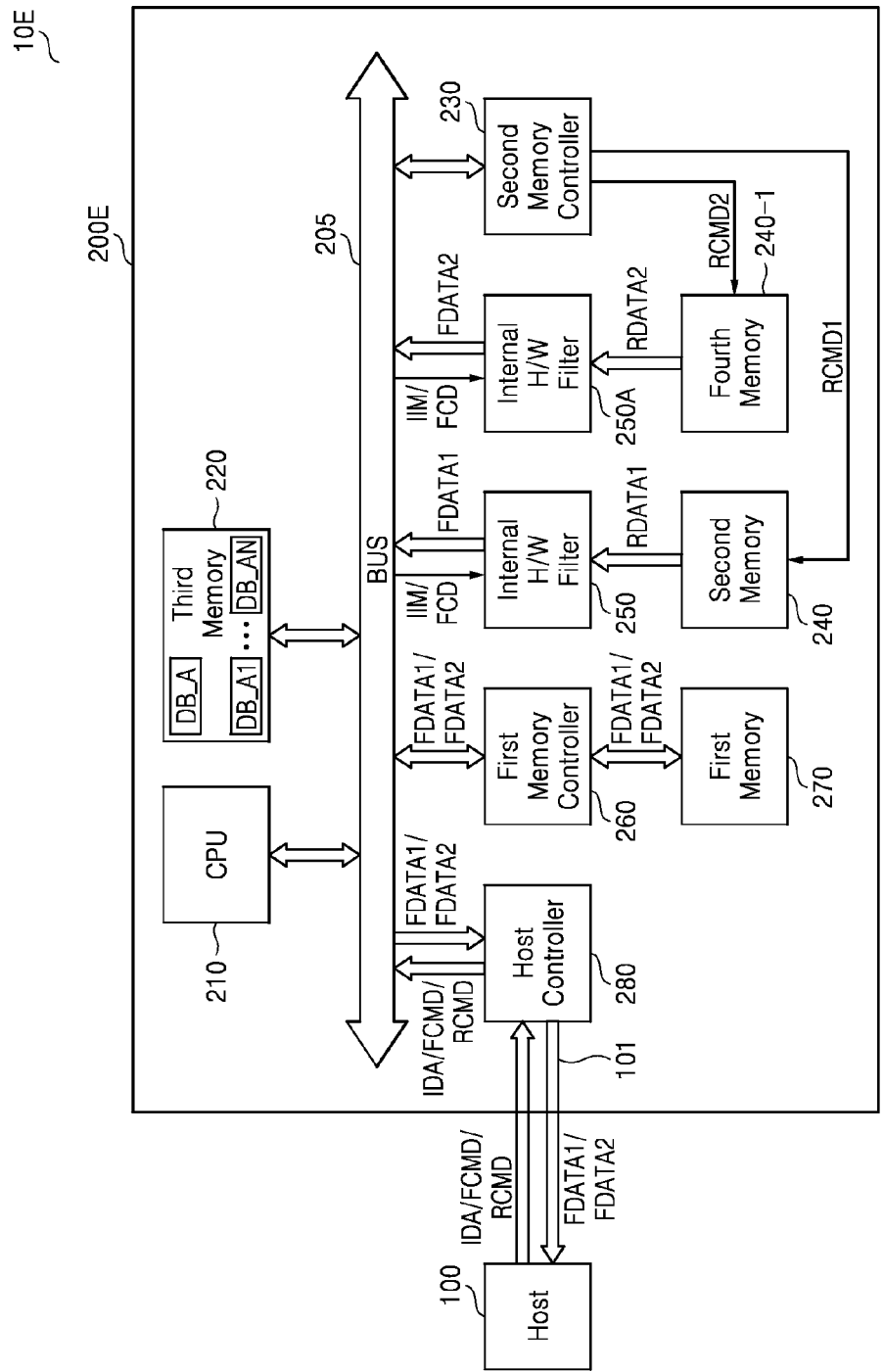
FIG. 14 is a block diagram of a data processing system according to still other embodiments of the present disclosure.

FIG. 14 is a block diagram of a data processing system 10E according to still other embodiments of the present disclosure. Referring to FIG. 14, the data processing system 10E may include the host 100 and a data storage device 200E. Except for the partial operation of the CPU 210 and the third memory 220 in the data storage device 200E illustrated in FIG. 14, structure and operations of the data storage device 200E may be substantially the same as those of the data storage device 200D illustrated in FIG. 13. The host 100 may control the operation of the data storage device 200E.

The host 100 may output to the data storage device 200E the indication data IDA indicating a data format corresponding to the changed application DB_A. In other embodiments, the indication data IDA may be included in the filtering command FCMD.

The CPU 210 may execute the changed application DB_A based on the indication data IDA. For example, the CPU 210 may select and execute the changed application DB_A that supports the data format related with the indication data IDA among a plurality of the applications DB_A through DB_AN stored in the data storage device 200E, e.g., the third memory 220. In other embodiments, the applications DB_A through DB_AN may be stored in the first memory 270 or the second memory 240.

When an application is changed, the CPU 210 may transmit to the internal H/W filters 250 and 250A the initialization information IIM corresponding to the changed application DB_A so that the internal H/W filters 250 and 250A can support the changed application DB_A. The internal H/W filters 250 and 250A may set the layout data L_DATA corresponding to the data format supported by the changed application DB_A based on the initialization information IIM. In other words, the internal H/W filters 250 and 250A may be adaptively initialized based on the initialization information IIM, which corresponds to the changed application DB_A and has been output from the CPU 210.

Figure 15:
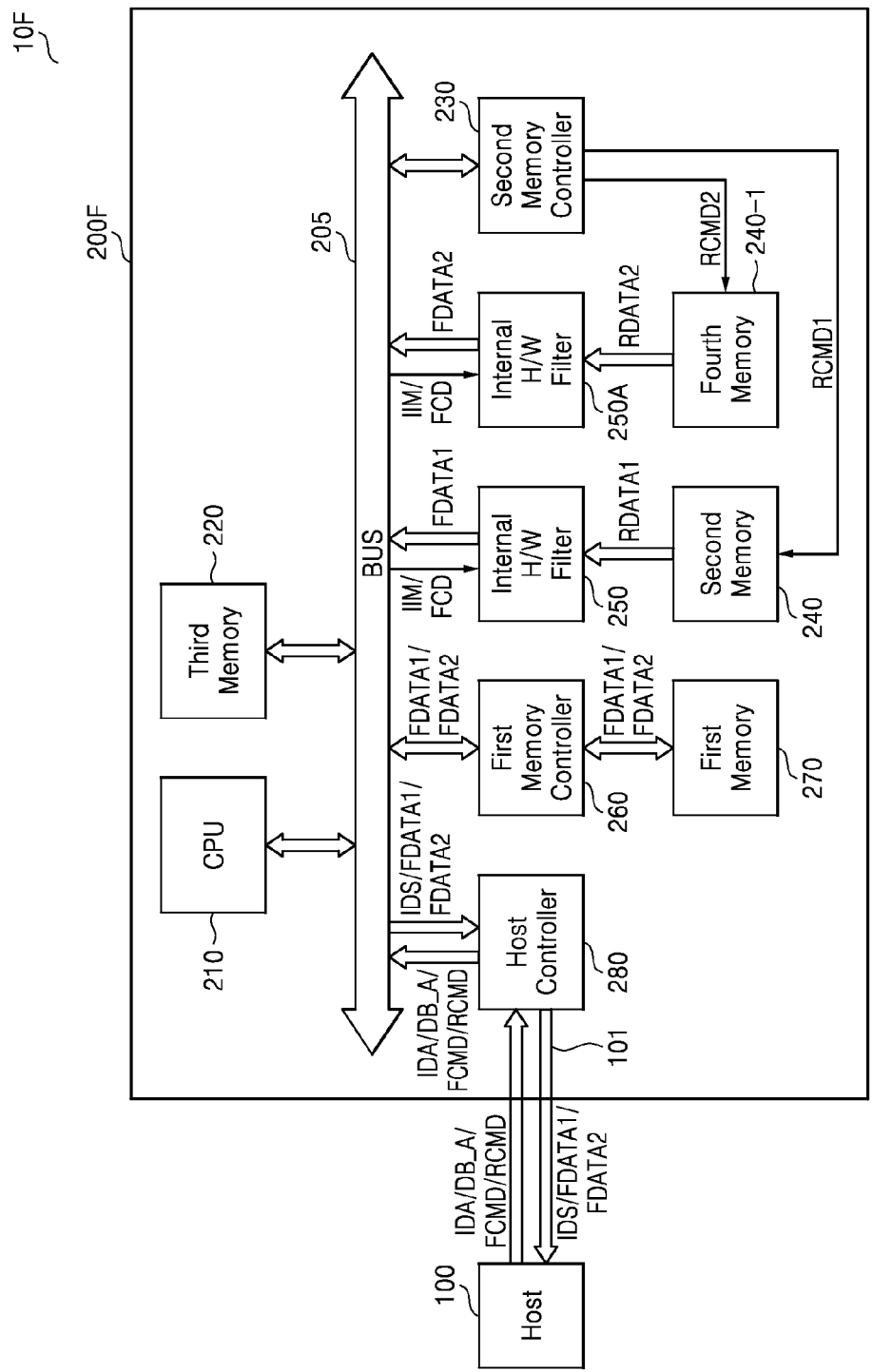
FIG. 15 is a block diagram of a data processing system according to still other embodiments of the present disclosure.

FIG. 15 is a block diagram of a data processing system 10F according to still other embodiments of the present disclosure. Referring to FIG. 15, the data processing system 10F may include the host 100 and a data storage device 200F. Except for the partial operation of the CPU 210 in the data storage device 200F illustrated in FIG. 15, structure and operations of the data storage device 200F may be substantially the same as those of the data storage device 200D illustrated in FIG. 13. The host 100 may control the operation of the data storage device 200F.

The host 100 may output to the data storage device 200F the indication data IDA indicating a data format corresponding to the changed application DB_A. In other embodiments, the indication data IDA may be included in the filtering command FCMD.

The CPU 210 may execute the changed application DB_A based on the indication data IDA. For example, the CPU 210 may generate a confirmation signal IDS indicating whether the data storage device 200F supports the changed application DB_A that supports the data format related with the indication data IDA, and the CPU 210 may transmit the confirmation signal IDS to the host 100.

The CPU 210 may receive the changed application DB_A that has been output from the host 100 based on the confirmation signal IDS, and may execute the changed application DB_A. In other words, the host 100 may transmit the changed application DB_A to the data storage device 200F in response to the confirmation signal IDS indicating that the data storage device 200F cannot support the changed application DB_A. In some embodiments, the changed application DB_A that is output from the host 100 may be stored in the first memory 270, the second memory 240, or the fourth memory 240-1. In other embodiments, the changed application DB_A that is output from the host may be stored in the third memory 220.

When an application is changed, the CPU 210 may transmit to the internal H/W filters 250 and 250A the initialization information IIM corresponding to the changed application DB_A so that the internal H/W filters 250 and 250A can support the changed application DB_A. The internal H/W filters 250 and 250A may set the layout data L_DATA corresponding to the data format supported by the changed application DB_A based on the initialization information IIM. In other words, the internal H/W filters 250 and 250A may be adaptively initialized based on the initialization information IIM, which corresponds to the changed application DB_A and has been output from the CPU 210.

Figure 16:
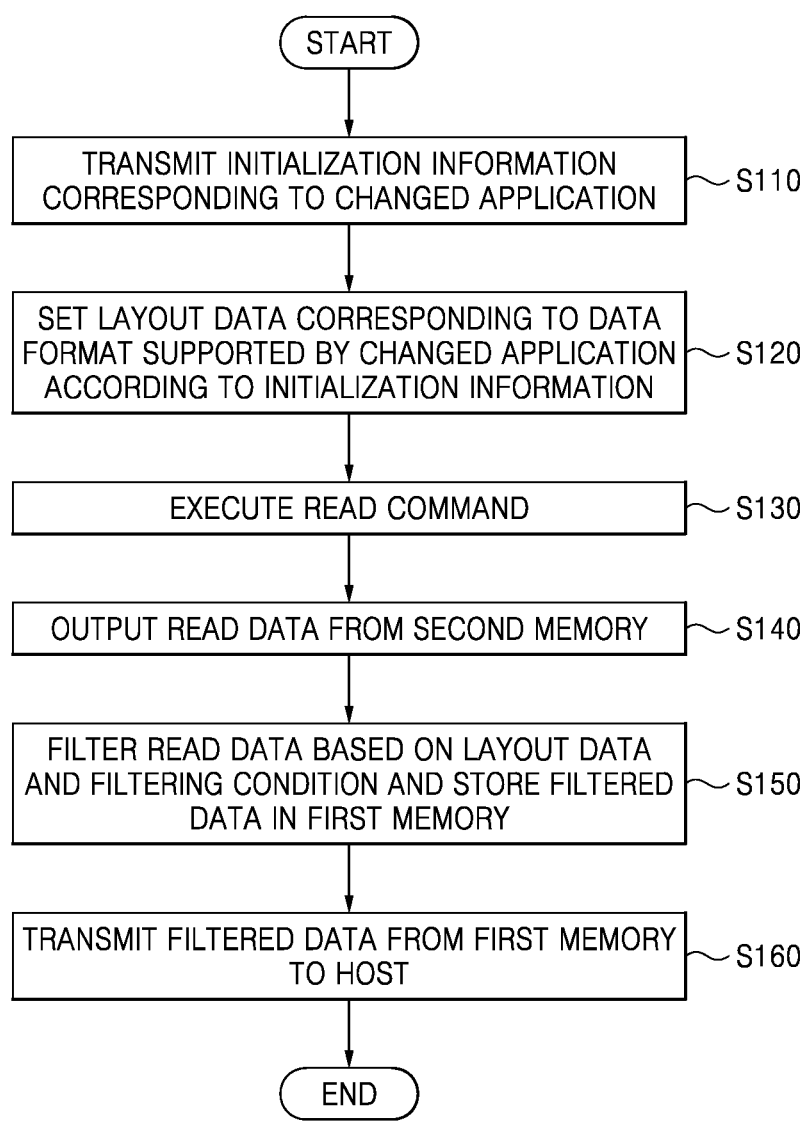
FIG. 16 is a flowchart of a method of operating a data processing system according to some embodiments of the present disclosure.

FIG. 16 is a flowchart of a method of operating a data processing system according to some embodiments of the present disclosure. A method of operating the data storage device 200A, 200B, 200C 200D, 200E, or 200F (collectively denoted by 200) including the CPU 210, one or more auxiliary memories 240 and 240-1, and one or more internal H/W filters 250 and 250A will be described with reference to FIGS. 1 through 16.

When an application is changed, the CPU 210 may transmit to the one or more internal H/W filters 250 and 250A the initialization information IIM corresponding to the changed application DB_A in operation S110 so that the one or more internal H/W filters 250 and 250A can support the changed application DB_A. The one or more internal H/W filters 250 and 250A may set the layout data L_DATA corresponding to a data format supported by the changed application DB_A based on the initialization information IIM in operation S120.

The one or more auxiliary memories 240 and 240-1 may execute the read commands RCMD1 and RCMD2, respectively, in operation S130, and may transmit the read data RDATA1 and RDATA2 to the one or more internal H/W filters 250 and 250A, respectively, in operation S140. The one or more internal H/W filters 250 and 250A may respectively filter the read data RDATA1 and RDATA2 using the layout data L_DATA and the filtering condition data FCD, and may respectively store the filtered data FDATA1 and FDATA2 in the first memory 270 via the bus 205 and the first memory controller 260 in operation S150.

The first memory controller 260 may transmit the filtered data FDATA1 and/or FDATA2 from the first memory 270 to the host 100 via the bus 205 and the host controller 280 in operation S160.

Figure 17:
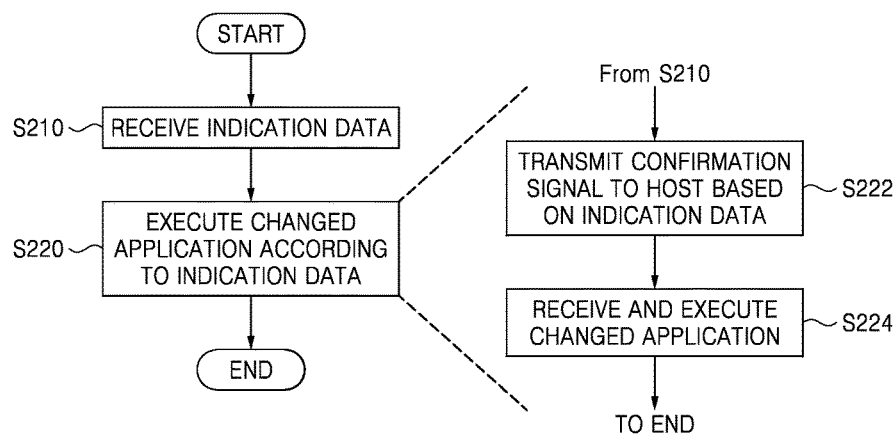
FIG. 17 is a flowchart of a method of executing a changed application according to some embodiments of the present disclosure.

FIG. 17 is a flowchart of a method of executing the changed application DB_A according to some embodiments of the present disclosure. The data storage device 200 may receive the indication data IDA indicating a data format corresponding to the changed application DB_A from the host 100 in operation S210, and may execute the changed application DB_A based on the indication data IDA in operation S220. At this time, the data storage device 200 may generate the confirmation signal IDS indicating whether the data storage device 200 can support the changed application DB_A that supports the data format related with the indication data IDA, and may transmit the confirmation signal IDS to the host 100 in operation S222.

The data storage device 200 may receive the changed application DB_A that is output from the host 100 based on the confirmation signal, and may execute the changed application DB_A in operation S224.

Figure 18:
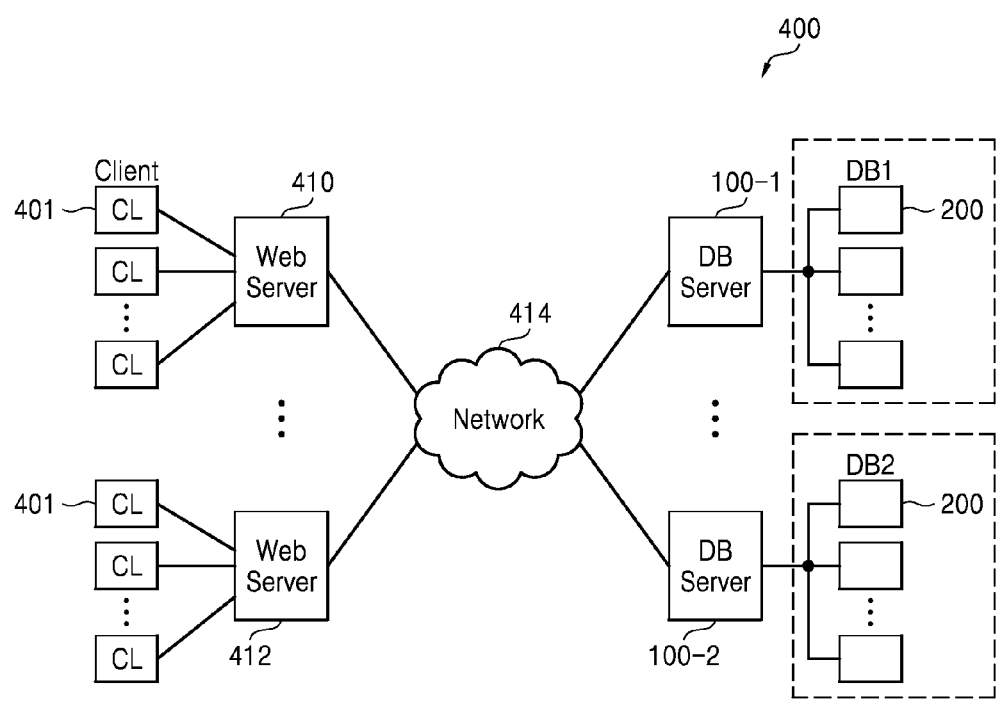
FIG. 18 is a block diagram of a data server system according to some embodiments of the present disclosure.

FIG. 18 is a block diagram of a data server system 400 according to some embodiments of the present disclosure. Referring to FIG. 18, the data server system 400 may include a plurality of clients 401, a plurality of web servers 410 and 412, a plurality of database servers 100-1 and 100-2, and a plurality of databases DB1 and DB2.

The data server system 400 may be a search portal or an internet data center (IDC). The clients 401 may communicate with the web servers 410 and 412 via a network 414. Each of the clients 401 may be implemented as a personal computer (PC), a laptop computer, a smartphone, a tablet PC, a personal digital assistant (PDA), or a mobile internet device (MID).

The web servers 410 and 412 may communicate with the database servers 100-1 and 100-2 via the network 414. Each of the database servers 100-1 and 100-2 may function as the host 100.

The database servers 100-1 and 100-2 may control operations of the databases DB1 and DB2, respectively, and may access the databases DB1 and DB2, respectively. Each of the databases DB1 or DB2 may include a plurality of data storage devices 200.

The network 414 may be a wired network, a wireless network, an internet, or a mobile telephone network.

As described above, according to some embodiments of the present disclosure, an all-in-one data storage device including a CPU and an internal H/W filter may initialize and use the internal H/W filter when an application is changed, without replacing the internal H/W filter. As a result, the all-in-one data storage device may minimize traffic of data transmitted from non-volatile memory to volatile memory.

Since the internal H/W filter filters big data near the non-volatile memory in the all-in-one data storage device, traffic related with transmission of the big data may be reduced. As a result, the all-in-one data storage device may reduce its internal data traffic.

Since the all-in-one data storage device filters the big data using the internal H/W filter and transmits the filtered data to a host (or a server), data traffic between the all-in-one data storage device and the host may be reduced. In addition, since the host processes the data that has been filtered by the all-in-one data storage device, the load on the host may be reduced.

While the present disclosure has been particularly shown and described with reference to exemplary embodiments thereof, it will be understood by those of ordinary skill in the art that various changes in forms and details may be made therein without departing from the spirit and scope of the present disclosure as defined by the following claims.

What is claimed is:

1. A method of operating a data storage device which includes a central processing unit (CPU), a hardware filter, a first memory and a second memory, the method comprising:

initializing the hardware filter based on initialization information corresponding to a changed application when the application is changed so that the hardware filter supports the changed application;

filtering read data that is output from the second memory based on filtering condition data;
outputting the filtered read data using the hardware filter; and
transmitting the filtered read data to a host via the first memory.

2. The method of claim 1, wherein the initializing the hardware filter comprises setting layout data related with a data format supported by the changed application in a register of the hardware filter.

3. The method of claim 1, wherein:
the initializing the hardware filter comprises:
receiving indication data indicating a data format corresponding to the changed application from the host; and
executing the changed application based on the indication data.

4. The method of claim 3, wherein the executing the changed application comprises selecting the changed application that supports the data format related with the indication data from a plurality of applications stored in the data storage device.

5. The method of claim 4, wherein the plurality of applications are stored in one of the first memory and the second memory.

6. The method of claim 3, wherein the executing the changed application comprises:
generating a confirmation signal indicating whether the data storage device can support the changed application that supports the data format related with the indication data;
transmitting the confirmation signal to the host; and
receiving the changed application that is output from the host based on the confirmation signal.

7. The method of claim 6, wherein the changed application that is output from the host is stored in one of the first memory and the second memory.

8. The method of claim 1, wherein the application is firmware allowing the data storage device to support a data format corresponding to the application.

9. An all-in-one data storage device comprising:
a central processing unit (CPU) configured to execute an application;
a first memory;
a second memory configured to output read data in response to a read command;
an internal hardware filter configured to set layout data corresponding to a data format supported by a changed application based on initialization information that is output from the CPU when the application is changed, the internal hardware filter being configured to filter the read data based on the layout data and filtering condition data, the internal hardware filter being configured to output the filtered read data;
a host controller; and
a memory controller configured to transmit the filtered read data to the host controller using the first memory.

10. The data storage device of claim 9, further comprising:
a third memory configured to store a plurality of applications, wherein:
the CPU is configured to select the changed application that supports the data format among the plurality of applications based on indication data indicating the data format, and
the CPU is configured to execute the changed application.

11. The data storage device of claim 9, wherein:
the CPU is configured to generate a confirmation signal indicating whether the changed application supporting the data format is supportable in response to indication data indicating the data format,
the CPU is configured to transmit the confirmation signal to the host, and
the CPU is configured to receive and execute the changed application that is output from the host based on the confirmation signal.

12. The data storage device of claim 9, wherein:
the second memory is a flash memory,
the first memory is a dynamic random access memory (DRAM), and
the all-in-one data storage device is a solid state drive.

13. The data storage device of claim 9, wherein the internal hardware filter comprises:
a controller configured to extract the layout data from the initialization information;
a register configured to store the layout data;
a data buffer configured to buffer the read data;
a data extractor configured to extract first extraction data and second extraction data by parsing columns in a row of the read data using the layout data and extraction condition data in the filtering condition data; and
a data comparator configured to compare matching key data in the filtering condition data with the first extraction data and to decide whether to output the second extraction data as the filtered read data based on a comparison result.

14. A data storage device comprising:
a central processing unit (CPU) configured to execute a plurality of applications including a first application and a second application;
a volatile memory;
a nonvolatile memory;
a memory controller; and
an internal hardware filter including:
a controller;
a configuration register;
a data buffer;
a data extractor; and
a data comparator, wherein
when the CPU changes an execution from the first application to the second application, the internal hardware filter is configured to be reconfigured using information related with the second application.

15. The data storage device of claim 14, wherein the first application manages data stored in the data storage device.

16. The data storage device of claim 14, wherein the execution is changed from the first application to the second application based on a type of data format.

17. The data storage device of claim 14, wherein:
the CPU is configured to transmit initialization information corresponding to the second application to the internal hardware filter, and
the internal hardware filter is configured to support the second application.

18. The data storage device of claim 14, wherein the CPU is configured to receive a filtering command from a host, interpret the filtering command, generate filtering condition data based on an interpretation result, and transmit the generated filtering condition data to the internal hardware filter.

19. The data storage device of claim 14, wherein the memory controller is configured to generate a read command and to transmit the read command to the nonvolatile memory, and the nonvolatile memory is configured to output read data to the internal hardware filter in response to the read command.

20. The data storage device of claim 19, wherein the internal hardware filter is configured to filter the read data and to transmit the filtered read data to the volatile memory.

* * * * *